United States Patent
Guo

(10) Patent No.: US 8,300,354 B2
(45) Date of Patent: Oct. 30, 2012

(54) HARD DISK DRIVES USING A BI-PRODUCT OF MANUFACTURING A ZTMD LUBRICANT TO TRAP SUB-MICROMETER PARTICLES

(75) Inventor: Xing-Cai Guo, Tracy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 336 days.

(21) Appl. No.: 12/646,814

(22) Filed: Dec. 23, 2009

(65) Prior Publication Data

US 2011/0149436 A1    Jun. 23, 2011

(51) Int. Cl.
*G11B 33/14*    (2006.01)

(52) U.S. Cl. ............ 360/97.13; 360/97.17; 360/97.22

(58) Field of Classification Search .... 360/97.01–97.04, 360/97.12–97.22
See application file for complete search history.

(56) References Cited

U.S. PATENT DOCUMENTS

| | | | |
|---|---|---|---|
| 4,001,892 A | 1/1977 | Castelli et al. | 360/133 |
| 5,251,082 A * | 10/1993 | Elliott et al. | 360/98.07 |
| 5,485,327 A | 1/1996 | Yanagisawa | 360/97.02 |
| 6,980,392 B2 | 12/2005 | Pierson | 360/97.02 |
| 7,683,012 B2 * | 3/2010 | Burns et al. | 508/110 |
| 2007/0060487 A1 | 3/2007 | Burns et al. | 508/582 |
| 2008/0176106 A1 | 7/2008 | Guo et al. | 428/800 |
| 2008/0190160 A1 | 8/2008 | Tran et al. | 71/25 |

FOREIGN PATENT DOCUMENTS

| | | |
|---|---|---|
| GB | 2 155 353 A | 9/1985 |
| JP | 2173996 | 7/1990 |
| JP | 2226578 | 9/1990 |
| JP | 4103091 | 4/1992 |
| JP | 5234352 | 9/1993 |
| JP | 11167786 | 6/1999 |
| JP | 2002/222577 | 8/2002 |

* cited by examiner

*Primary Examiner* — Allen Heinz
(74) *Attorney, Agent, or Firm* — Zilka-Kotab, PC

(57) ABSTRACT

A magnetic disk drive having a layer of ZTMD raffinate coated within a housing of the disk drive to trap debris in order to prevent contamination related failure of the disk drive. The ZTMD raffinate can be applied to the inside of the housing of the disk drive, such as to side walls of the housing and or the cover of the housing. The ZTMD raffinate can also be applied to a filter structure within the housing in order improve the performance of the filter structure and prevent contamination collected thereon from becoming dislodged.

24 Claims, 6 Drawing Sheets

HARD DISK DRIVES USING A BI-PRODUCT OF MANUFACTURING A ZTMD LUBRICANT TO TRAP SUB-MICROMETER PARTICLES

FIELD OF THE INVENTION

The present invention relates to air filtration in a magnetic disk drive apparatus and more particularly to the use of a viscous coating on an interior of a disk drive to trap particulates in a disk drive.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

In current disk drive systems, the fly height of the slider over the disk has become extremely small, even on the order of a few nano-meters. At these small fly heights, the disk drive systems become increasingly susceptible to damage from particle contamination within the disk drive device. Sub-micronmeter particles inside the hard disk drive can cause it to fail due to physical contact at the head-disk interface. These particles may come from environmental air or may be generated from various parts within the disk drive system itself during its operation.

In order to mitigate this contamination related failure, particle filters have been used to filter contaminant particles out of the air during the operation of the disk drive. The efficacy of such filters is, however, inherently limited. For example, such filters rely on the flow of air through the filter. The flow of air from the rotation of the disk may be limited and insufficient to provide enough airflow for effective filter operation. This becomes more pronounced when the filter becomes saturated and air flow through the filter is further restricted. In addition, as the filter becomes coated with debris a physical shock to the disk drive system can cause the collected debris to become dislodged. This can allow a large amount of contamination to fall onto the disk all at once, thereby creating an even larger contamination problem than if no filter were used at all.

Therefore, it can be seen that there remains a need for a mechanism for ridding an interior of a disk drive of contamination, especially of small nano-scale particles in a disk drive apparatus. With the high sensitivity to cost in the current data storage industry such a mechanism would also preferably be very low in cost to implement.

SUMMARY OF THE INVENTION

The present invention provides a magnetic disk drive that includes a housing, a magnetic disk mounted within the housing and a suspension arm pivotally mounted within the housing. A slider is connected with the suspension arm for movement adjacent to a surface of the disk, and a layer of ZTMD raffinate is applied to at least a portion of the housing.

The layer of ZTMD raffinate is a sticky, viscous layer that traps debris particles, preventing them from damaging the disk drive, such as by contact with the disk and/or slider. The ZTMD raffinate can be applied to side walls of the housing and/or to the cover of the housing. The ZTMD raffinate could be applied to some other structure within the housing, in addition to or in lieu of being applied to the interior of the housing itself.

The disk drive can be provided with an air filter, and this air filter can be coated with a layer of ZTMD raffinate. This coating of ZTMD raffinate on the filter improves performance of the filter and also prevents debris on the filter from becoming dislodged from the filter.

ZTMD raffinate is an otherwise useless by-product of ZTMD lubricant fractionation, and can therefore be used with no additional manufacturing cost. In addition, it is highly viscous, adheres particles tightly, bonds strongly to metal surfaces, and is thermally stable up to 350 degrees C. It has no volatility and no emission at disk drive operation temperatures. It therefore introduces no contamination into the disk drive.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
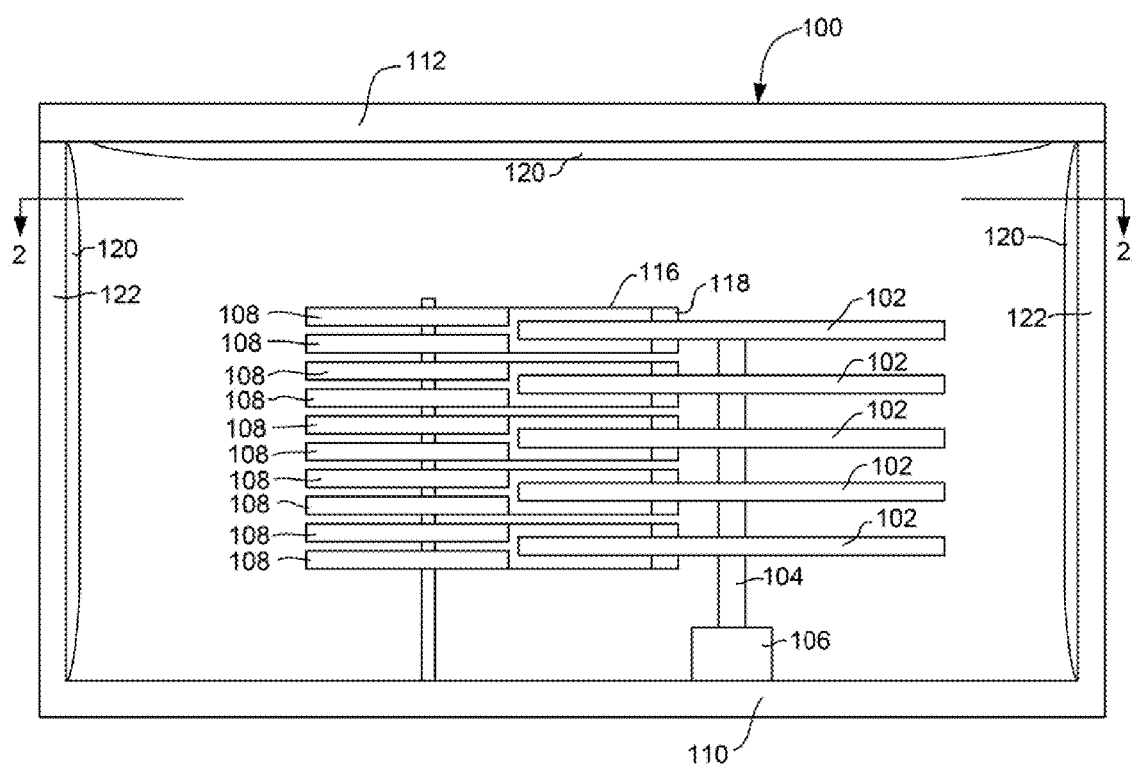
FIG. 1 is a schematic side cross sectional view of a disk drive device in which the invention might be implemented.

Referring now to FIG. 1, there is shown a disk drive 100 embodying this invention. As shown in FIG. 1, at least one or more rotatable magnetic disks 102 are supported on a spindle 104 and rotated by a disk drive motor 106. The magnetic recording on each disk is in the form of annular patterns of concentric data tracks (not shown) on the magnetic disk 102. The disks 102, spindle 104 and motor 106 are mounted within a housing 110, which may include a removable housing cover 112 to allow access to the components within the housing 110.

Figure 2:
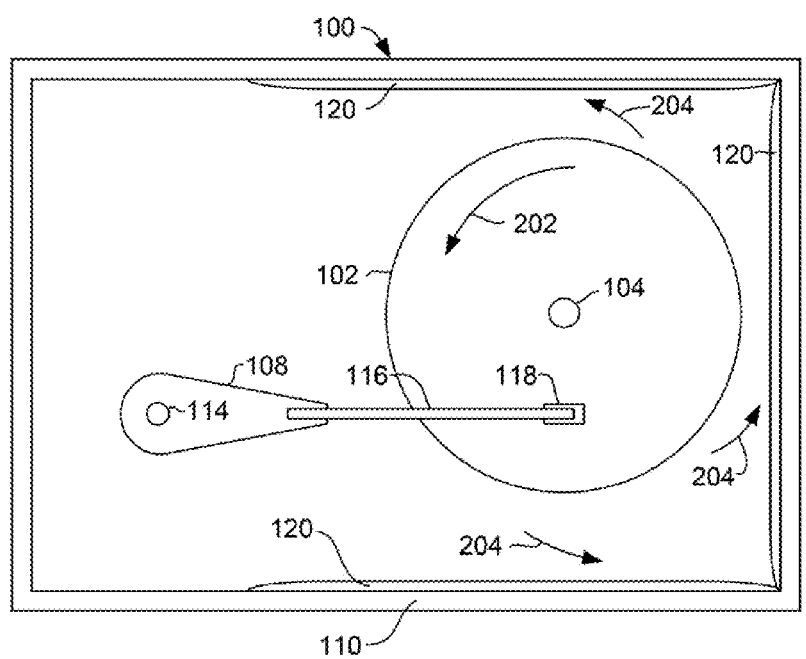
FIG. 2 is a top down view of the disk drive device as seen from line 2-2 of FIG. 1.

One or more suspension arm assemblies 108 are held within the housing 110 on a support structure 114. Each of the suspension arm assemblies 108 includes a suspension 116 which holds a slider 118 adjacent to a surface of one of the disks 102. FIG. 2 shows a top down view wherein it can be seen that the suspension arm assembly can move the slider 118 in an arcuate path across the disk 102 to access various tracks of data on the disk 102. A magnetic head (not shown) is formed on the trailing edge of the slider 118 and includes a magnetoresistive sensor (to read magnetic signals from the disk 102) and a magnetic write head (to write magnetic signals to the disk 102).

The disk 102 spins (as indicated by arrow 202 in FIG. 2). This spinning of the disk 102 causes air adjacent to the disk to move along with the disk due to viscosity of the air and frictional forces between the air and the disk 102. The slider 118 flies on a cushion of this moving air adjacent to the surface of the disk 102. In this way the slider 118 can fly above the disk at a very low fly height above the disk. As discussed above this fly height is extremely small, being on the order of nano-meters or even Angstroms. This therefore, causes disk drive system 100 to be extremely susceptible to damage from contamination or debris, since even extremely small particles can cause a fatal crash of the slider and cause permanent damage to the head and/or disk.

In order to mitigate this, the present invention includes a layer of ZTMD raffinate 120 coated to at least a portion of the interior of the disk drive device 100. ZTMD raffinate is a viscous sticky substance that has shown exceptional performance in trapping stray particles or debris within the chamber 110 of the disk drive device. As shown in FIG. 1, the layer of ZTMD raffinate can be applied to all or a portion of the interior of the chamber 110. For example, the ZTMD raffinate can be applied to the sides 122 of the chamber or can be applied to the interior surface of the cover 112. The ZTMD raffinate could be applied to both the sides 122 and the cover 112 or to just the sides 122 or just the cover 112. This is by way of example, however, as the ZTMD raffinate could be applied to other structures of the disk drive device 100 such as, but not limited to the bottom of the chamber 110 or other structures (either shown or not shown) within the chamber 110. The ZTMD raffinate is preferably located within the chamber 110 to be within somewhat close proximity to the disks 102 and with a path of air flow within the chamber. For example as seen in FIG. 2, the spinning of the disk can cause a flow of air (indicated by arrows 204) as a result of frictional and centrifugal forces. Therefore, placing the ZTMD raffinate in the path of this airflow about the periphery of the disk 102 can optimize the performance of the ZTMD raffinate optimizing the likelihood that the ZTMD raffinate will quickly trap any debris, especially if such debris is being flung outward from the disk itself.

The use of ZTMD raffinate provides many practical advantage for use as a debris trapping layer. ZTMD raffinate is an otherwise useless by-product of ZTMD lubricant fractionation at about 40% yield and is, therefore, available at no cost whatsoever. In fact this use of ZTMD raffinate actually reduces cost by eliminating the need to dispose of the otherwise useless ZTMD raffinate. In addition, it is highly viscous, adheres particles tightly, and bonds strongly to metal surfaces. Furthermore, it is thermally stable up to 350 degrees C. It has no volatility and no emission at drive operation temperatures. Therefore, it introduces no contamination into the drive.

The above describes an embodiment wherein ZTMD raffinate is applied to various structures of the interior of a disk drive. As those skilled in the art will appreciate, and as discussed in the background of the invention, disk drives can be provided with air filters for the purpose of minimizing contamination. Also as discussed above, these filters alone have proved inadequate for completely preventing debris related failures in disk drives. One reason for this is that the filters can become clogged or saturated so that air flow is restricted and the filter is no longer effective in removing debris. In addition, accumulated debris can become dislodged from the filter material and contaminate the disk in a sudden large quantity, leading to disk drive failure.

Figure 3:
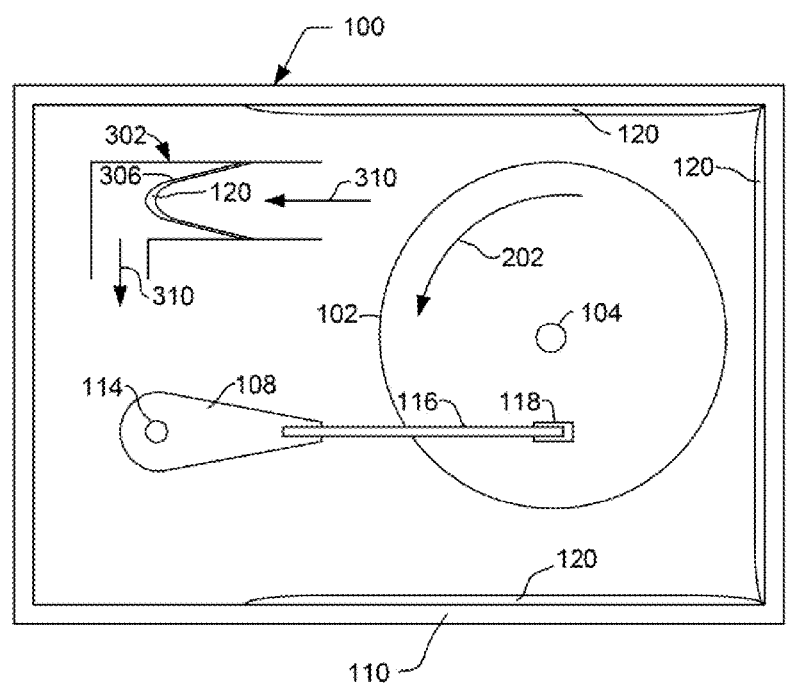
FIG. 3 is a view similar to that of FIG. 2, illustrating a disk drive device according to an alternate embodiment of the invention.

FIG. 3 illustrates a disk drive system, similar to that described with reference to FIG. 2, except that the disk drive 300 of FIG. 3 includes a filter structure 302 that includes an air duct 304 in which a filter material 306 is mounted. The filter material can be a material such as paper or fabric and can be formed into a V or cone shape. However the structure and shape of the duct 304 and filter material 306 are by way of example as any number of other suitable filter structures could be employed. As discussed above, the spinning of the disk 102 causes air to circulate through the disk drive chamber 110. The air duct 306 is arranged to channel this air flow (indicated by arrows 310) through the duct 304 and through the filter material 306.

In order to improve the efficiency of the filter, and also ensure that none of the debris trapped in the filter material becomes dislodged, the filter material itself 306 is coated with the ZTMD raffinate discussed above. This coating of the filter material 306 can be in addition to or in lieu of applying a coating of ZTMD raffinate 120 to other structures such as the interior walls of the chamber 110 or the cover 112 (FIG. 1).

Figure 4:
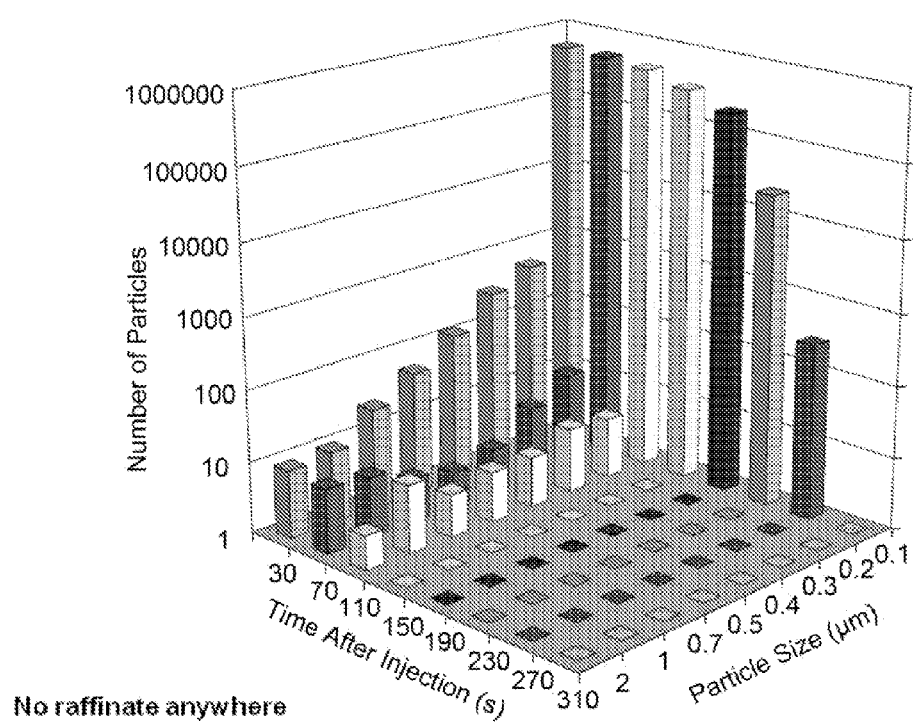
FIG. 4 is graph illustrating a rate of elimination of particles of various sizes in a disk drive in which the present invention has not been implemented.
Figure 5:
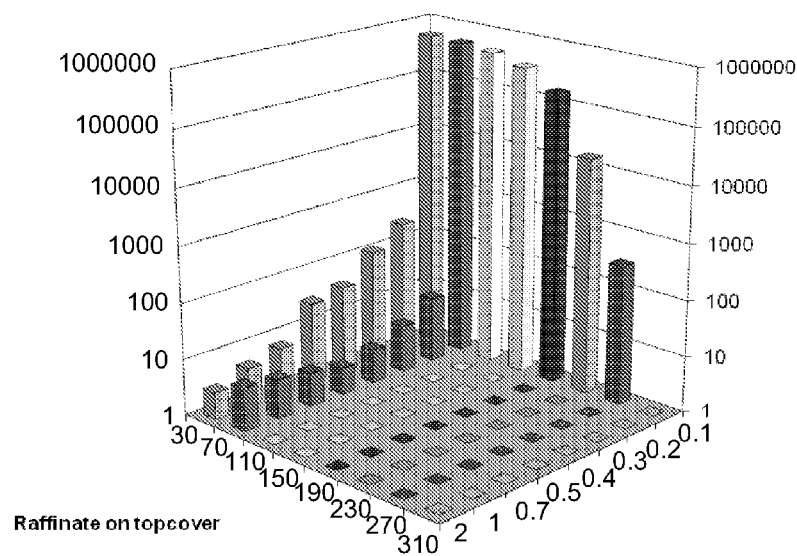
FIG. 5 is a graph representing a rate of elimination of particles of various sizes in a disk drive in which a certain embodiment of the invention has been implemented.
Figure 6:
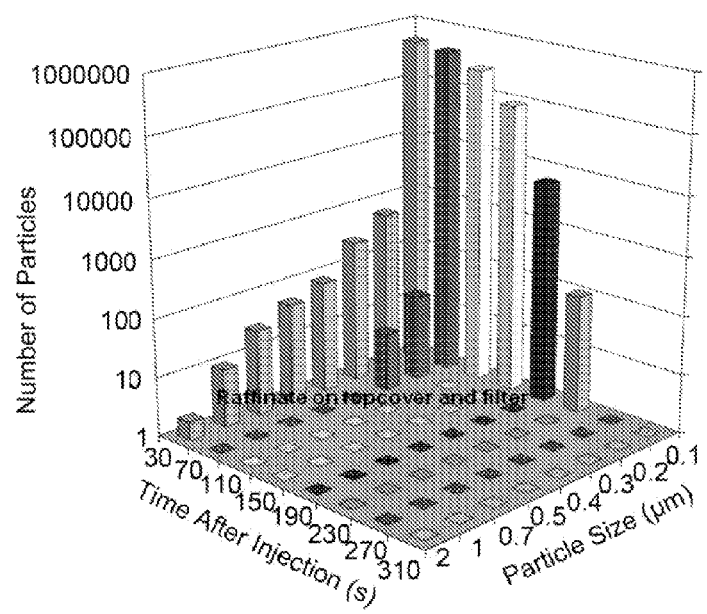
FIG. 6 is a graph illustrating a rate of elimination of particles of various sizes in a disk drive in which an alternate embodiment of the invention has been implemented.

To illustrate the effectiveness of the above described invention in mitigating debris contamination in a disk drive, reference can be made to FIGS. 4, 5 and 6. FIG. 4 is a three dimensional graph, the z axis representing the number of particles, the y axis representing the time after injection of particles into the disk drive device, and the x axis representing the size of the particle. FIG. 4 illustrates a scenario wherein the disk drive has a filter, but no ZTMD raffinate. As can be seen, even after 110 seconds a significant number of particles remain.

FIG. 5 shows a similar graph illustrating a scenario wherein only the top cover 112 of the housing 110 (See FIG. 1) has been coated with ZTMD raffinate. In this case it can be seen that while some particles remain after 70 seconds virtually all oldie particles have been eliminated by 110 seconds from the time of injection, except for the smallest particles of 0.1 um.

FIG. 6 shows a scenario wherein the top cover 112 of the housing 110 has been coated with ZTMD raffinate and also the filter material 306 (FIG. 3) has been coated with ZTMD raffinate. As can be seen, all of the particles of size 0.4 um and larger have been removed by 0.7 seconds, all of the particles of size 0.2 and larger have been removed by 110 seconds, and all of the particles of size 0.1 and larger have been removed by 230 seconds.

Therefore it can be seen that the present invention provides significant improvement in the removal of debris contamination from a disk drive apparatus. What's more, the present invention accomplishes this with virtually no additional cost, since the ZTMD raffinate is merely a by-product material that would otherwise have to be disposed of. In addition, the invention accomplishes this with no negative side effects such as out-gassing or contamination from the ZTMD raffinate material itself.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic disk drive, comprising:
   a housing;
   a magnetic disk mounted within the housing;
   a suspension arm pivotally mounted within the housing;
   a slider connected with the suspension arm for movement adjacent to a surface of the disk; and
   a layer of viscous sticky, viscous material applied to at least a portion of the housing, the viscous sticky material being a bi-product of manufacturing a ZTMD lubricant.

2. The magnetic disk drive as in claim 1 wherein the housing includes a cover, and wherein the viscous sticky, viscous material is applied to the cover.

3. The magnetic disk drive as in claim 1 wherein the housing includes a cover and wherein the viscous sticky, viscous material is applied to the cover and to no other portion of the housing.

4. The magnetic disk drive as in claim 1 wherein the housing has side walls and wherein the viscous sticky, viscous material is applied to the side walls.

5. The magnetic disk drive as in claim 1 wherein the housing includes side walls and wherein the viscous sticky, viscous material is applied to portions of the side walls that are near the disk.

6. The magnetic disk drive as in claim 1 wherein the housing includes side walls and a cover and wherein the viscous sticky, viscous material is applied to at least a portion of the cover and at least a portion of the side walls.

7. The magnetic disk drive as in claim 1 further comprising a structure within the housing, and a layer of viscous sticky, viscous material applied to the structure.

8. The magnetic disk drive as in claim 1 further comprising a filter mounted within the housing, and a layer of viscous sticky, viscous material applied to the filter.

9. The magnetic disk drive as in claim 1 wherein the disk drive comprises a plurality of disks.

10. The magnetic disk drive as in claim 1 wherein the viscous, sticky material is a bi-product of fractionation of ZTMD lubricant.

11. A magnetic disk drive, comprising:
    a housing;
    a magnetic disk mounted within the housing;
    a suspension arm pivotally mounted within the housing;
    a slider connected with the suspension arm for movement adjacent to a surface of the disk;
    a structure within the housing; and
    a layer of viscous, sticky material applied to the structure, the viscous sticky material being a bi-product of manufacturing a ZTMD lubricant.

12. The magnetic disk drive as in claim 11 wherein the structure and layer of viscous sticky, viscous material are near the disk drive.

13. The magnetic disk drive as in claim 11 wherein the magnetic disk is mounted within the chamber so as to spin, and wherein the spinning of the disk generates an air flow within the housing, and wherein the structure and layer of viscous sticky, viscous material are positioned to be within a path of the air flow.

14. The magnetic disk drive as in claim 11 further comprising a filter held within the housing, the filter having a layer of the viscous sticky, viscous material applied thereto, such that both the structure and the filter have a layer of the viscous sticky, viscous material applied thereto.

15. The disk drive as in claim 11 wherein the disk drive comprises a plurality of magnetic disks.

16. The magnetic disk drive as in claim 11 wherein the viscous, sticky material is a bi-product of fractionation of ZTMD lubricant.

17. A magnetic disk drive, comprising:
    a housing;
    a magnetic disk mounted within the housing;
    a suspension arm pivotally mounted within the housing;
    a slider connected with the suspension arm for movement adjacent to a surface of the disk;
    a filter structure mounted within the housing; and
    a layer of viscous, sticky material applied to at least a portion of the filter structure, the viscous, sticky material being a bi-product of manufacturing a ZTMD lubricant.

18. The magnetic disk drive as in claim 17 wherein the filter structure includes an air duct and a filter material mounted within the air duct, the layer of viscous sticky, viscous material being applied to the filter material.

19. The magnetic disk drive as in claim 18 wherein the filter material is a porous material through which air can flow.

20. The magnetic disk drive as in claim 17 wherein the disk has a periphery and wherein the filter is located adjacent to the periphery.

21. The magnetic disk drive as in claim 17 wherein the disk mounted so as to spin within the housing, the spinning of the disk resulting in an air flow within the chamber, the filter being located within the chamber so as to be with a path of the air flow.

22. The magnetic disk drive as in claim 17 wherein the viscous sticky, viscous material is applied to only to the filter structure and not to any other structure of the disk drive.

23. The disk drive as in claim 17 wherein the disk drive comprises a plurality of magnetic disks.

24. The magnetic disk drive as in claim 17 wherein the viscous, sticky material is a bi-product of fractionation of ZTMD lubricant.

* * * * *